(12) United States Patent
Varela et al.

(10) Patent No.: US 12,128,706 B2
(45) Date of Patent: Oct. 29, 2024

(54) AXLE ASSEMBLY HAVING A BRAKE DRUM

(71) Applicant: ArvinMeritor Technology, LLC, Troy, MI (US)

(72) Inventors: Tomaz Varela, Troy, MI (US); Chuntao Wang, Troy, MI (US)

(73) Assignee: ArvinMeritor Technology, LLC, Troy, MI (US)

( * ) Notice: Subject to any disclaimer, the term of this patent is extended or adjusted under 35 U.S.C. 154(b) by 694 days.

(21) Appl. No.: 17/325,598

(22) Filed: May 20, 2021

(65) Prior Publication Data

US 2022/0371361 A1 Nov. 24, 2022

(51) Int. Cl.
*B60B 11/02* (2006.01)
*B60B 27/00* (2006.01)
*B60K 17/04* (2006.01)
*F16D 51/18* (2006.01)

(52) U.S. Cl.
CPC .......... *B60B 11/02* (2013.01); *B60B 27/0057* (2013.01); *B60K 17/046* (2013.01); *F16D 51/18* (2013.01)

(58) Field of Classification Search
CPC ...... B60B 11/00; B60B 11/02; B60B 27/0057
See application file for complete search history.

(56) References Cited

U.S. PATENT DOCUMENTS

| | | | |
|---|---|---|---|
| 2,267,362 A * | 12/1941 | Ash | F16H 48/08 301/5.1 |
| 2,357,343 A | 9/1944 | Morgan | |
| 3,363,726 A * | 1/1968 | Koenig | B60B 11/06 188/18 R |
| 3,790,218 A * | 2/1974 | Johns | B60B 11/02 301/36.1 |
| 3,882,975 A | 5/1975 | Jedlitschka et al. | |
| 4,210,220 A * | 7/1980 | Balter | B60B 11/02 384/489 |
| 4,214,792 A * | 7/1980 | Hardwicke | B60B 11/02 301/36.1 |
| 4,743,070 A * | 5/1988 | Henke | B60B 11/02 301/36.1 |
| 8,690,265 B2 * | 4/2014 | Noblanc | B60B 11/02 301/36.1 |
| 8,955,623 B2 * | 2/2015 | Bittlingmaier | B60B 27/0052 180/370 |
| 9,308,895 B2 * | 4/2016 | Bowyer | F16D 51/20 |

(Continued)

FOREIGN PATENT DOCUMENTS

DE 1021736 B 12/1957
WO 2012138603 A2 10/2012

OTHER PUBLICATIONS

Extended European Search Report dated Nov. 28, 2022 for related European Application No. 22174563.1; 8 pgs.

(Continued)

*Primary Examiner* — Jason R Bellinger
(74) *Attorney, Agent, or Firm* — Brooks Kushman PC

(57) ABSTRACT

An axle assembly having a brake drum and inboard and outboard wheels. The brake drum the inboard wheel may cooperate to inhibit movement of the inboard wheel in an inboard direction. An outboard wheel clamp and an outboard split ring may cooperate to inhibit movement of the outboard wheel in an outboard direction.

20 Claims, 3 Drawing Sheets

(56) References Cited

U.S. PATENT DOCUMENTS

| | | | |
|---|---|---|---|
| 9,677,628 B2 | 6/2017 | Moss | |
| 9,797,442 B2 * | 10/2017 | Kim | F16C 19/548 |
| 9,969,211 B2 * | 5/2018 | Niemczyk | B60B 11/02 |
| 9,987,879 B2 * | 6/2018 | Moyna | B60B 11/06 |
| 10,965,186 B2 * | 3/2021 | Banks | B60B 27/0057 |
| 2007/0052284 A1 | 3/2007 | White et al. | |
| 2012/0256474 A1 * | 10/2012 | Gorle | B60B 37/00 |
| | | | 301/105.1 |
| 2022/0049751 A1 * | 2/2022 | Shah | F16D 65/22 |
| 2022/0379658 A1 * | 12/2022 | Wang | B60B 27/0057 |

OTHER PUBLICATIONS

Article 94(3) EPC Communication dated Jul. 1, 2024 for related European Application No. 22174563.1; 5 Pages.

* cited by examiner

AXLE ASSEMBLY HAVING A BRAKE DRUM

TECHNICAL FIELD

This relates to an axle assembly that has a brake drum and a method of assembly.

BACKGROUND

A wheel end assembly having a drum brake assembly is disclosed in U.S. patent publication no. 2022/0049751.

SUMMARY

In at least one embodiment an axle assembly is provided. The axle assembly includes a wheel hub, a brake drum, an inboard wheel, an outboard wheel, an outboard split ring, and an outboard wheel clamp. The wheel hub is rotatable about an axis and has a mounting flange. The brake drum is fastened to the mounting flange. The inboard wheel encircles the brake drum. The outboard wheel encircles the wheel hub. The outboard split ring is received inside the outboard wheel and engages the wheel hub. The outboard wheel clamp is received inside the outboard wheel, engages the outboard wheel, and is fastened to the outboard split ring. The outboard wheel clamp and the outboard split ring cooperate to inhibit movement of the outboard wheel in an outboard direction. The brake drum and the inboard wheel cooperate to inhibit movement of the inboard wheel in an inboard direction that is opposite the outboard direction.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
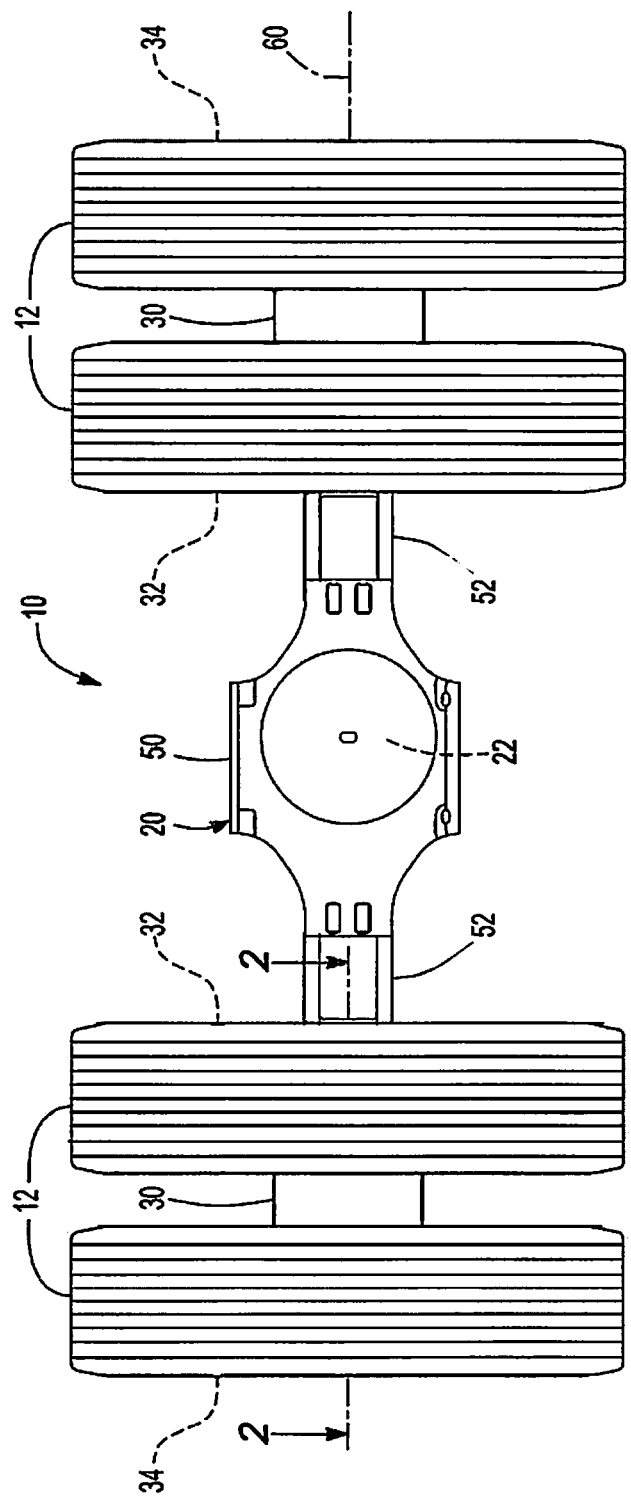
FIG. 1 is a perspective view of an example of an axle assembly.

Referring to FIG. 1, an example of an axle assembly 10 is shown. The axle assembly 10 may be provided with a vehicle like a truck, bus, farm equipment, mining equipment, military transport or weaponry vehicle, or cargo loading equipment for land, air, or marine vessels.

The axle assembly 10 may be part of a vehicle drivetrain that may transmit torque between at least one power source and a wheel assembly. The power source may be an electrical power source like an electric motor, a non-electrical power source like an internal combustion engine, or combinations thereof. A wheel assembly may include a tire 12 mounted on a wheel. Four wheel assemblies are illustrated in FIG. 1.

One or more axle assemblies 10 may be provided with the vehicle. For example, the axle assembly 10 may be a single drive axle assembly or may be configured as part of a tandem axle configuration or multi-axle configuration that may include a plurality of axle assemblies connected in series. As is best shown with reference to FIGS. 1 and 2, the axle assembly 10 may include a housing assembly 20, a differential assembly 22, at least one axle shaft 24, and at least one brake assembly 26. The axle assembly 10 may also include at least one wheel end assembly that may include a wheel hub 30, an inboard wheel 32, an outboard wheel 34, and a brake drum 36. A wheel end assembly may also include an outboard split ring 42, at least one outboard wheel clamp 44, and a wheel spacer 46.

Referring to FIG. 1, the housing assembly 20 may receive various components of the axle assembly 10. In addition, the housing assembly 20 may facilitate mounting of the axle assembly 10 to the vehicle. The housing assembly 20 may have a center portion 50 that may receive the differential assembly 22. In addition, the housing assembly 20 may have a pair of arm portions 52 that extend from the center portion 50. Each arm portion 52 may support a wheel end assembly as well as an axle shaft 24 and a brake assembly 26.

The differential assembly 22 may be at least partially received inside the center portion 50 of the housing assembly 20. The differential assembly 22 may be rotatable about the axis 60 and may transmit torque to the axle shafts 24 and their associated wheels. The differential assembly 22 may be operatively connected to the axle shafts 24 and may permit the axle shafts 24 to rotate at different speeds in a manner known by those skilled in the art.

Figure 2:
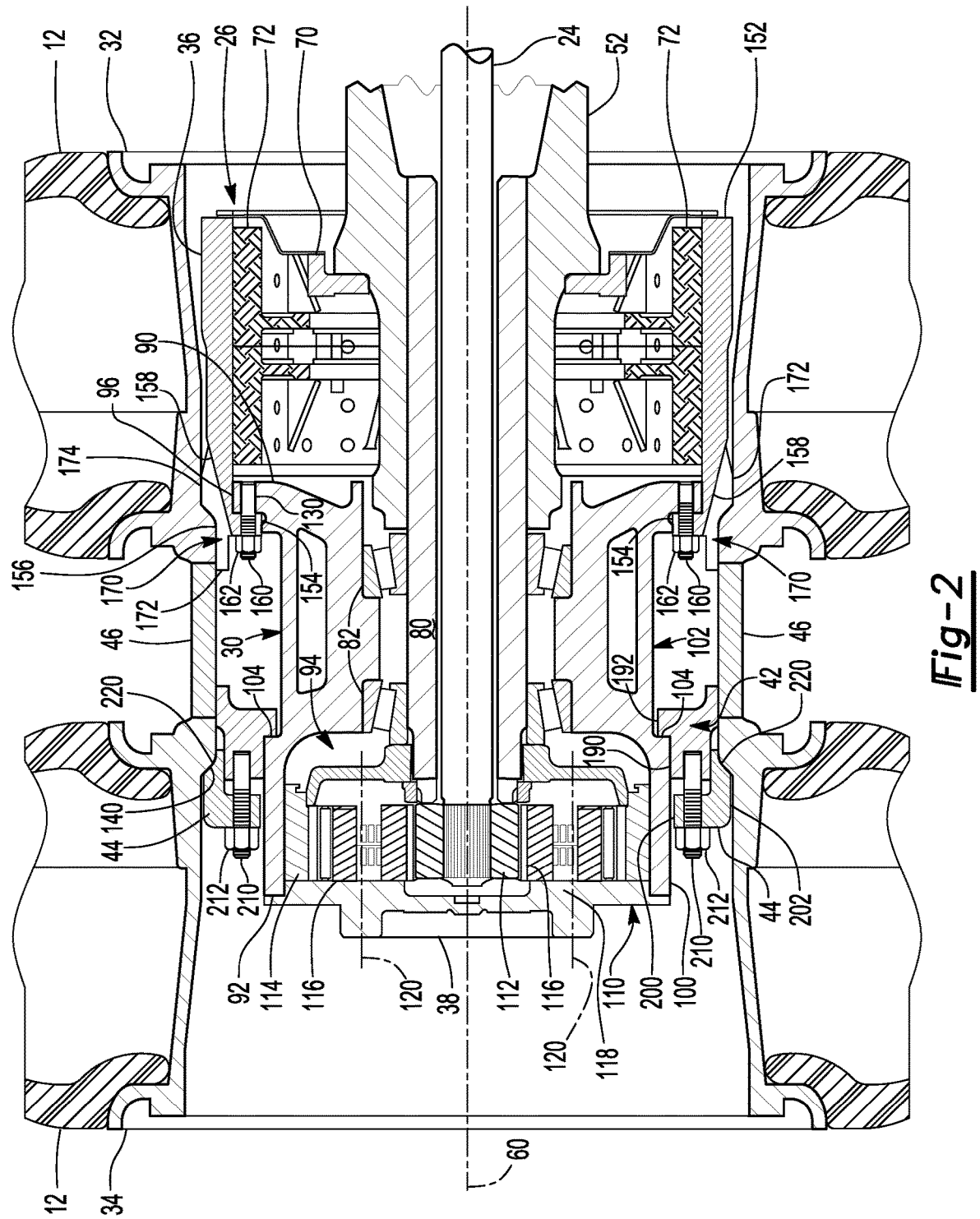
FIG. 2 is a section view along section line 2-2.

Referring to FIG. 2, an axle shaft 24 may transmit torque from the differential assembly 22 to a corresponding traction wheel assemblies. Two axle shafts 24 may be provided such that each axle shaft 24 extends through a different arm portion 52. The axle shafts 24 may extend along and may be rotatable about an axis, such as the axis 60. Each axle shaft 24 may have a first end and a second end. The first end may be operatively connected to the differential assembly 22. The second end may be disposed opposite the first end and may be operatively connected to a wheel hub 30.

Figure 3:
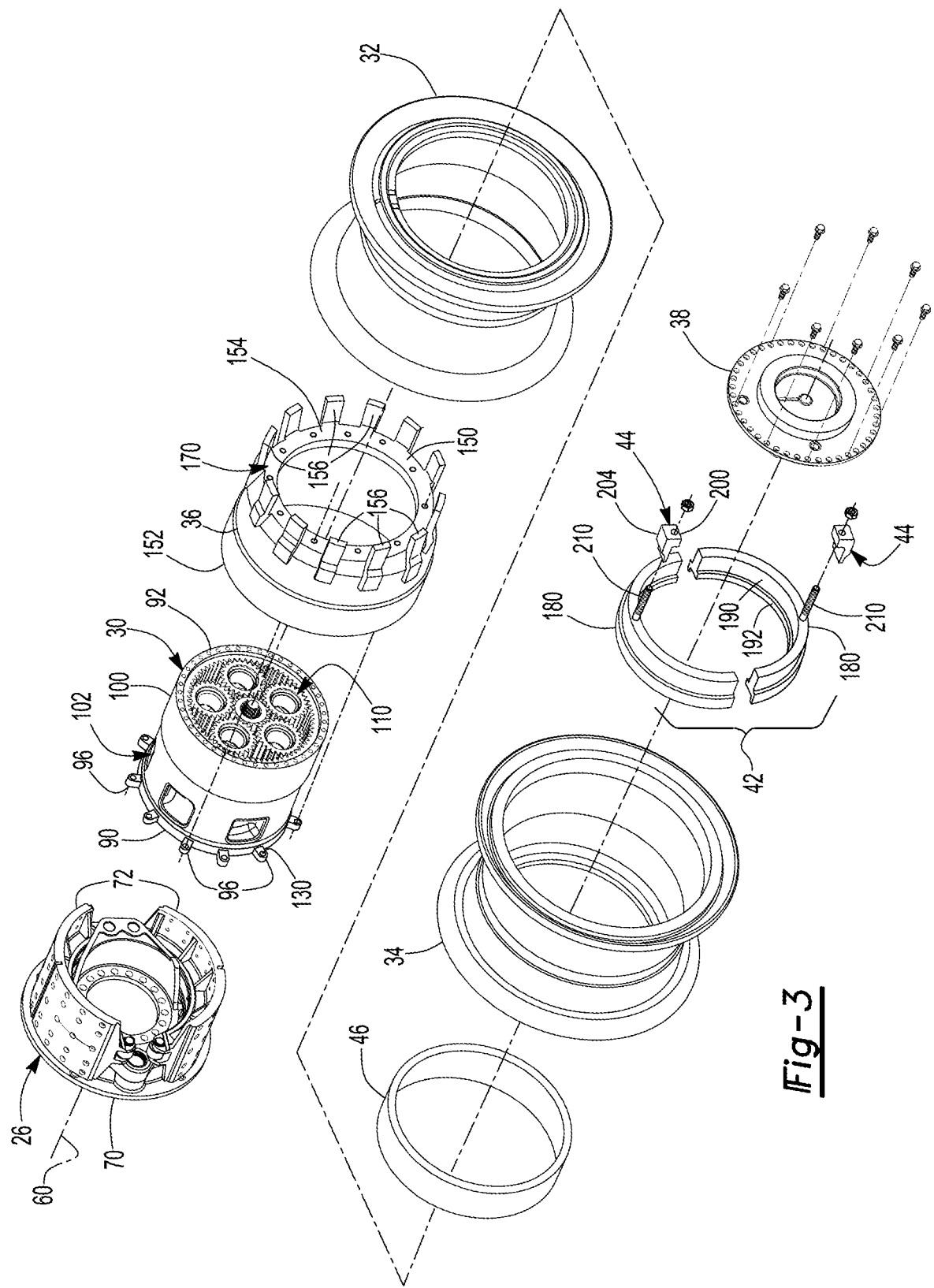
FIG. 3 is an exploded view of a portion of the axle assembly.

Referring to FIGS. 2 and 3, the brake assembly 26 may be a friction brake that may be configured to slow or inhibit rotation of at least one associated wheel. In the configuration shown, the brake assembly 26 is configured as a drum brake and may include a brake spider 70 and one or more brake pad assemblies 72.

The brake spider 70 may facilitate mounting of the brake assembly 26 to an arm portion 52 of the housing assembly 20. In addition, the brake spider 70 may support various components of the brake assembly 26, such as a brake pad assembly 72.

One or more brake pad assemblies 72 may be moveable with respect to the brake spider 70. In the configuration shown, two brake pad assemblies 72 are depicted. A brake pad assembly 72 may be received inside and may be configured to engage the brake drum 36. For instance, the brake pad assembly 72 may include friction material that may be disposed on a brake shoe. The friction material may engage the inside of the brake drum 36 during vehicle braking and may be spaced apart from the brake drum 36 when friction braking is not applied.

The wheel hub 30 may be rotatable about an axis, such as the axis 60. As is best shown in FIG. 2, the wheel hub 30 may be rotatable about the axis 60 with respect to the arm portion 52 and a spindle 80 that may be provided with the arm portion 52. The wheel hub 30 may be rotatably supported by one or more wheel bearings 82 that may be disposed on the spindle 80. In at least one configuration and as is best shown with reference to FIGS. 2 and 3, the wheel hub 30 may include an inboard end 90, an outboard end 92, a hub cavity 94, and at least one mounting flange 96. The wheel hub 30 may also include an outboard exterior side 100, a recess 102, and a step surface 104.

The inboard end 90 may face toward the brake assembly 26 or to the right from the perspective shown in FIG. 2.

The outboard end 92 may be disposed opposite the inboard end 90. The outboard end 92 may face toward and may engage the hub cap 38. Alternatively, another component such as an axle shaft flange may engage the outboard end 92.

The hub cavity 94 may extend around the axis 60. The hub cavity 94 may receive various components that may be associated with the wheel end assembly, such as the spindle 80, wheel bearings 82, seals, and the like. The hub cavity 94 may also receive a gear reduction unit 110.

The gear reduction unit 110 may operatively connect the axle shaft 24 to the wheel hub 30 and may provide gear reduction between the axle shaft 24 and the wheel hub 30. The gear reduction unit 110 may have any suitable configuration. For instance, the gear reduction unit 110 may be configured as a planetary gear set or a bevel gear set. In the configuration shown, the gear reduction unit 110 may be configured as a planetary gear set that may include a sun gear 112, a planetary ring gear 114, at least one planet gear 116, and a planet gear carrier 118.

The sun gear 112 may be rotatable about the axis 60 with the axle shaft 24. The sun gear 112 may have a set of teeth that may be arranged around the axis 60 and may be configured to mate or mesh with corresponding teeth of the planet gears 116.

The planetary ring gear 114 may be configured as a ring that may extend around the axis 60. The planetary ring gear 114 may encircle the planet gears 116 and may have a set of teeth that may extend toward the axis 60 and may mate or mesh with teeth of the planet gears 116. In the configuration shown, the planetary ring gear 114 is fixedly positioned with respect to the spindle 80 and does not rotate about the axis 60.

At least one planet gear 116 may be rotatably disposed between the sun gear 112 and the planetary ring gear 114. Each planet gear 116 may be rotatable about a different planet gear axis 120. As is best shown in FIG. 2, each planet gear 116 may define a hole that may be disposed along the planet gear axis 120 and may have a set of teeth that face away from the planet gear axis 120.

The planet gear carrier 118 may support the planet gears 116. In the configuration shown, the hub cap 38 is the planet gear carrier 118 and is fixedly positioned with respect to the wheel hub 30 such that the wheel hub 30 and the planet gear carrier 118 are rotatable together about the axis 60. The planet gear carrier 118 may include a plurality of shafts or pins. Each shaft or pin may be received in the hole of a corresponding planet gear 116.

Referring to FIGS. 2 and 3, at least one mounting flange 96 may be provided that facilitates mounting of the brake drum 36 to the wheel hub 30. The mounting flange 96 may extend away from the axis 60 and may be disposed closer to the inboard end 90 than to the outboard end 92. For instance, the mounting flange 96 may extend from the inboard end 90 toward the outboard end 92. A single mounting flange 96 may be provided that may extend continuously or discontinuously around the axis 60. Alternatively, a plurality of mounting flanges 96 may be provided that may be spaced apart from each other and may be arranged around the axis 60. In the configuration shown, six mounting flanges 96 are illustrated; however, it is contemplated that a greater or lesser number of mounting flanges 96 may be provided. The mounting flanges 96 may be coplanar. A mounting flange 96 may define at least one fastener hole 130. A fastener hole 130 may be a through hole or a blind hole and may be threaded.

The outboard exterior side 100 may face away from the axis 60. The outboard exterior side 100 may be disposed proximate the outboard end 92 of the wheel hub 30. For instance, the outboard exterior side 100 may extend axially between the outboard end 92 of the wheel hub 30 and the recess 102.

The recess 102 may be axially positioned between the outboard exterior side 100 and the mounting flange 96. The recess 102 may be disposed closer to the axis 60 than the outboard exterior side 100.

Referring to FIG. 3, the step surface 104 may extend from the outboard exterior side 100 toward the axis 60. For instance, the step surface 104 may extend from an end of the outboard exterior side 100 to a bottom surface of the recess 102. In at least one configuration, the step surface 104 may be disposed substantially perpendicular to the axis 60. The term "substantially perpendicular" is used herein to designate features or axes that are the same as or very close to perpendicular and includes features that are within ±2° of being perpendicular each other. The step surface 104 may also be disposed in a non-perpendicular relationship with the axis 60.

In the text below, the terms "inboard direction" and "outboard direction" are used to designate relative positioning of various components. The inboard direction may be a direction that extends along the axis 60 from an end of the axle assembly 10 toward the center portion 50 of the housing assembly 20, or to the right from the perspective shown in FIG. 2. Conversely, an outboard direction may be oriented opposite the inboard direction and may be a direction that extends along the axis 60 away from the center portion 50. The terms inboard and outboard are used in a similar manner to designate relative positioning. For example, a first feature that is positioned inboard with respect to a second feature is axially positioned closer to the center portion 50 that the second feature. Conversely, a first feature that is positioned outboard with respect to a second feature may be axially positioned farther from the center portion 50 that the second feature.

Referring primarily to FIG. 2, the inboard wheel 32 may support a tire 12. The inboard wheel 32 may be mounted on the wheel hub 30 via the brake drum 36 as will be discussed in more detail below. The inboard wheel 32 may encircle the brake drum 36 and may contact the brake drum 36.

The outboard wheel 34 may be spaced apart from the inboard wheel 32 and may support a different tire 12 than the inboard wheel 32. In at least one configuration, the inboard wheel 32 and the outboard wheel 34 may have the same configurations. As is best shown in FIG. 2, the outboard wheel 34 may encircle the wheel hub 30, the outboard split ring 42, and the outboard wheel clamp 44.

Optionally, the outboard wheel 34 may have a tapered surface 140. The tapered surface 140 may face toward the axis 60 and may be disposed in a nonparallel and non-perpendicular relationship with the axis 60. For instance, the tapered surface 140 may extend progressively closer to the axis 60 as the tapered surface 140 extends in the inboard direction. An outboard wheel clamp 44 may engage the tapered surface 140 as will be discussed in more detail below.

Referring primarily to FIGS. 2 and 3, the brake drum 36 may be mounted to or fastened to the wheel hub 30 such that the brake drum 36 is rotatable about the axis 60 with the wheel hub 30. As is best shown in FIG. 2, the brake drum 36 may be received inside the inboard wheel 32 and may have a cylindrical portion that may extend continuously around the brake pad assemblies 72. In at least one configuration, the brake drum 36 may include a first end 150, a second end 152, at least one brake drum mounting flange 154, a set of support features 156. The brake drum 36 may also include at least one brake drum tapered surface 158.

The first end 150 may face away from the brake assembly 26 or to the left from the perspective shown in FIG. 2. The first end 150 may be disposed substantially perpendicular to the axis 60.

The second end 152 may be disposed opposite the first end 150. The second end 152 may be a distal end or a free end of the brake drum 36.

The brake drum mounting flange 154 may facilitate mounting of the brake drum 36 to the mounting flange 96 of the wheel hub 30. The brake drum mounting flange 154 may be mounted to the mounting flange 96 such that the brake drum mounting flange 154 is axially positioned outboard with respect to the mounting flange 96 or to the left of the mounting flange 96 from the perspective shown in FIG. 2, thereby allowing the brake drum 36 to be removed from and installed on the wheel hub 30 without disassembling the wheel hub 30. The brake drum mounting flange 154 may be axially positioned between the first end 150 and the second end 152 and may be axially positioned closer to the first end 150 than to the second end 152.

The brake drum mounting flange 154 may extend toward the axis 60. One or more brake drum mounting flanges 154 may be provided. In the configuration shown in FIG. 3, one brake drum mounting flange 154 is illustrated that encircles the axis 60; however, it is contemplated that the brake drum mounting flange 154 may not encircle the axis 60 and that multiple brake drum mounting flanges may be provided.

Referring primarily to FIG. 2, the brake drum mounting flange 154 may define at least one fastener hole that receives a fastener 160 that couples the brake drum 36 to the wheel hub 30. For instance, a fastener 160, such a stud or a bolt, may extend through the fastener hole in the brake drum mounting flange 154 and into a corresponding fastener hole 130 in the mounting flange 96 of the wheel hub 30. The fastener 160 may have threads that mate with threads in the fastener hole 130. A nut 162 may be threaded onto the fastener 160 on the outboard side of the brake drum mounting flange 154 to secure the brake drum 36.

The set of support features 156 may be arranged around the axis 60, arranged around the brake drum mounting flange 154, or both. In at least one configuration, the support features 156 may be spaced apart from each other such that a gap 170 is provided between adjacent pairs of support features 156. FIG. 3 is sectioned through a pair of opposing gaps 170 and thus these gaps are visible in this figure. A support feature 156 may extend away from the axis with respect to the brake drum mounting flange 154 and may include a support flange 172 and a protrusion 174. The gaps 170 may reduce heat transmission from the brake drum 36 to the inboard wheel 32, which may help reduce heating of air inside the tire 12 of the inboard wheel 32. For instance, the gaps 170 may reduce the surface area of the inboard wheel 32 that contacts the brake drum 36 while still providing sufficient strength and mounting characteristics.

The support flange 172 may extend between the first end 150 and the brake drum mounting flange 154. As such, the support flange 172 may extend from the brake drum mounting flange 154 in the outboard direction. The support flange 172 may engage and support the inboard wheel 32, the wheel spacer 46, or both.

The protrusion 174 may extend away from the axis 60 and may extend farther from the axis 60 than an adjacent portion of the support flange 172 that extends in the outboard direction from the protrusion. The protrusion 174 may be engageable with the inboard wheel 32 to limit or inhibit axial movement of the inboard wheel 32 in the inboard direction.

At least one brake drum tapered surface 158 may be provided with the brake drum 36. For instance, a brake drum tapered surface 158 may extend in a circumferential direction between adjacent pairs of support features 156. The brake drum tapered surface 158 may face away from the axis 60. In addition, the brake drum tapered surface 158 may face toward and may be spaced apart from the inboard wheel 32. The brake drum tapered surface 158 may be disposed in a nonparallel and non-perpendicular relationship with the axis 60. For instance, the brake drum tapered surface 158 may extend progressively farther from the axis 60 as the distance from the first end 150 increases or as the brake drum tapered surface 158 extends farther inboard or as the distance from the brake drum mounting flange 154 increases in the inboard direction. In at least one configuration, the brake drum tapered surface 158 may extend in an inboard direction from the brake drum mounting flange 154.

The outboard split ring 42 may be received inside the outboard wheel 34. The outboard split ring 42 may engage the wheel hub 30 and may encircle the wheel hub 30. For instance, the outboard split ring 42 may engage the outboard exterior side 100 of the wheel hub 30. In addition, the outboard split ring 42 may engage the outboard wheel 34, the outboard wheel clamp 44, the wheel spacer 46, or combinations thereof.

The outboard split ring 42 may be configured as a multi-piece ring that may include a plurality of ring segments 180. In FIG. 3, two ring segments 180 are shown; however, it is contemplated that a greater or lesser number of ring segments 180 may be provided. The ring segments 180 may be separate parts or separate pieces that may cooperate to encircle or otherwise receive the wheel hub 30. In addition, the ring segments 180 may facilitate assembly to the wheel hub 30 such that at least a portion of the outboard split ring 42 may be received in the recess 102 of the wheel hub 30. One or more ring segments 180 may optionally be fastened to each other and/or to the wheel hub 30, such as with a fastener like a bolt or pin, to facilitate mounting of other components, such as the outboard wheel 34. In at least one configuration, the outboard split ring 42 may be clamped to the wheel hub 30.

In at least one configuration and as is best shown in FIG. 2, the outboard split ring 42 may have an inner surface 190 and an inner pilot 192.

The inner surface 190 may face toward the axis 60. The inner surface 190 may engage the outboard exterior side 100 of the wheel hub 30.

The inner pilot 192 may extend or protrude toward the axis 60 from the inner surface 190 and may extend into the recess 102 of the wheel hub 30. The inner pilot 192 may engage the wheel hub 30 to inhibit axial movement of the outboard split ring 42 in the outboard direction or to the left from the perspective shown in FIG. 2. For instance, the inner pilot 192 may engage the step surface 104 of the wheel hub 30.

Referring to FIGS. 2 and 3, at least one outboard wheel clamp 44 may be provided that may couple the outboard wheel 34 to the outboard split ring 42. The outboard wheel clamp 44 may be received inside the outboard wheel 34 and may extend between the outboard wheel 34 to the outboard split ring 42. In addition, the outboard wheel clamp 44 may be fastened to the outboard split ring 42. In at least one configuration, the outboard wheel clamp 44 may have a mounting portion 200 and an outer flange 202.

The mounting portion 200 may be disposed outboard with respect to the outboard wheel clamp 44, or to the left of the outboard wheel clamp 44 from the perspective shown in FIG. 2. In addition, the mounting portion 200 may extend toward the axis 60. The mounting portion 200 may define at least one fastener hole that may receive a fastener 210 that couples the outboard wheel clamp 44 to the outboard split ring 42. For instance, a fastener 210, such as a stud or bolt, may extend through the fastener hole in the outboard wheel clamp 44 and into a corresponding fastener hole in the outboard split ring 42. The fastener 210 may have threads that mate with threads in the fastener hole of the outboard split ring 42. A nut 212 may be threaded onto the fastener 210 on the outboard side of the mounting portion 200 to secure the outboard wheel clamp 44 and inhibit movement in the outboard direction.

The outer flange 202 may extend from the mounting portion 200 in an inboard direction, or to the right from the perspective shown in FIG. 2. For instance, the outer flange 202 may extend from an end of the mounting portion 200 and may be disposed farther from the axis 60 than the mounting portion 200. The outer flange 202 may engage the outboard wheel 34 and the outboard split ring 42. For example, the outer flange 202 may extend between the outboard wheel 34 and the outboard split ring 42. In at least one configuration, the outer flange 202 may have a tapered surface 220.

The tapered surface 220 may face away from the axis 60. In addition, the tapered surface 220 may be disposed in a nonparallel and non-perpendicular relationship with the axis 60. The tapered surface 220 may be axially positioned inboard with respect to the mounting portion 200 and may extend around a portion of the outboard split ring 42. The tapered surface 220 may be aligned with and may engage a surface of the outboard wheel 34, such as the tapered surface 140 of the outboard wheel 34. As such, the tapered surface 220 may contact the tapered surface 140 and the tapered surface 220 may extend progressively farther from the axis 60 in the outboard direction.

Referring primarily to FIG. 2, the wheel spacer 46 may extend from the inboard wheel 32 to the outboard wheel 34. In at least one configuration, the wheel spacer 46 may be configured as a ring that may encircle the axis 60 and that may be spaced apart from the wheel hub 30. The wheel spacer 46 may engage or contact the brake drum 36, the outboard split ring 42, or combinations thereof.

A method of assembling an axle assembly 10 will now be described. The method will primarily be described starting with an assembled wheel hub 30 and an inboard wheel 32, an outboard wheel 34, and a brake drum 36 that are not yet assembled to the wheel hub 30.

First, the brake drum 36 may be installed on the wheel hub 30 and mounted to the wheel hub 30. For example, the brake drum 36 may be aligned with the wheel hub 30 such that the opening of the brake drum 36 is generally centered about the axis 60. The brake drum 36 may then be moved along the axis 60 with respect to the wheel hub 30 in an inboard direction toward the mounting flange 96 such that the brake drum mounting flange 154 may engage the mounting flange 96 of the wheel hub 30. The brake drum 36 may then be secured to the wheel hub 30 with one or more fasteners 160 and/or nuts 162 as previously discussed.

Next, the inboard wheel 32 may be positioned on the brake drum 36 such that the inboard wheel 32 rests on and is generally centered about the brake drum 36.

The outboard split ring 42 may be installed on the wheel hub 30 such that the outboard split ring 42 may encircle the wheel hub 30 and the inner pilot 192 extends into the recess 102 of the wheel hub 30 and is disposed proximate the step surface 104 of the wheel hub 30.

The wheel spacer 46 and outboard wheel 34 may be installed and secured with the outboard wheel clamp 44. For instance, the nut 212 that receives the fastener 210 may be tightened to urge the outboard wheel clamp 44 toward the outboard split ring 42. Tightening the nut 212 may urge the outboard wheel clamp 44, the outboard wheel 34, the wheel spacer 46, and the inboard wheel 32, in the inboard direction and may inhibit movement of these components with respect to the wheel hub 30 and the brake drum 36. As such, the outboard wheel clamp 44 and the outboard split ring 42 may cooperate to inhibit movement of the inboard wheel 32 and the outboard wheel 34 in the outboard direction while the inboard wheel 32 and the brake drum 36 may cooperate to inhibit movement of the inboard wheel 32 and the outboard wheel 34 in the inboard direction. It is also contemplated that various components of the wheel end assembly may be keyed to each other to inhibit relative rotation.

An axle assembly as described above may facilitate the mounting of multiple wheels, which may be easier to install and remove as compared to a wider and heavier single wheel that may support multiple tires. Providing separate wheels along with a brake drum and an outboard split ring that are spaced apart from each other may allow associated load forces to be distributed across the wheel hub and may help transmit load forces to the wheel hub in a manner that may permit smaller, less expensive fasteners to be used. The wheels and brake drum may be removable from the wheel hub to provide improved access to the brake assembly, which may help reduce the time and cost required to replace the brake pad assemblies or perform other brake maintenance activities. Moreover, the wheels and brake drum may be installed on the wheel hub and removed from the wheel hub without disassembling the wheel hub or the gear reduction unit inside the wheel hub, which may reduce maintenance costs, maintenance time, and increase vehicle availability. An axle assembly as described above may allow a wheel hub to accommodate large planetary gear sets to help increase gear reduction capacity, which may be valuable in very large or very heavy vehicles, such as mining trucks.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. An axle assembly comprising:
   a wheel hub that is rotatable about an axis and that has a mounting flange;
   a brake drum that is fastened to the mounting flange;
   an inboard wheel that encircles the brake drum;
   an outboard wheel that encircles the wheel hub;
   an outboard split ring that is received inside the outboard wheel and engages the wheel hub; and an outboard wheel clamp that is received inside the outboard wheel, engages the outboard wheel, and is fastened to the outboard split ring, wherein the outboard wheel clamp and the outboard split ring cooperate to inhibit movement of the outboard wheel in an outboard direction and the brake drum and the inboard wheel cooperate to inhibit movement of the inboard wheel in an inboard direction that is opposite the outboard direction.

2. The axle assembly of claim 1 wherein the inboard wheel contacts the brake drum.

3. The axle assembly of claim 1 wherein a wheel spacer extends from the inboard wheel to the outboard wheel.

4. The axle assembly of claim 3 wherein the wheel spacer engages the brake drum and the outboard split ring.

5. The axle assembly of claim 3 wherein the wheel spacer encircles and contacts a portion of the brake drum and the outboard split ring.

6. The axle assembly of claim 3 wherein the wheel spacer is spaced apart from and does not engage the wheel hub.

7. The axle assembly of claim 1 wherein the brake drum has a brake drum mounting flange that extends toward the axis and that defines a fastener hole that receives a fastener that couples the brake drum to the mounting flange of the wheel hub.

8. The axle assembly of claim 7 wherein the brake drum has a set of support features arranged around the brake drum mounting flange, wherein each support feature has a support flange that extends from the brake drum mounting flange in the outboard direction, wherein the support flange engages the inboard wheel and a wheel spacer extends from the inboard wheel to the outboard wheel.

9. The axle assembly of claim 8 wherein each support feature has a protrusion that extends away from the axis and that engages the inboard wheel to inhibit movement of the inboard wheel in the inboard direction.

10. The axle assembly of claim 8 wherein the support features are spaced apart from each other such that a gap is provided between adjacent pairs of support features.

11. The axle assembly of claim 7 wherein a brake drum tapered surface that faces away from the axis and toward the inboard wheel is provided between an adjacent pair of support features, wherein the brake drum tapered surface is spaced apart from the inboard wheel.

12. The axle assembly of claim 11 wherein the brake drum tapered surface is disposed progressively farther from the axis as a distance from the brake drum mounting flange increases.

13. The axle assembly of claim 1 wherein the wheel hub has an outboard exterior side that faces away from the axis and a recess that is disposed closer to the axis than the outboard exterior side and that is axially positioned between the outboard exterior side and the mounting flange, wherein the outboard split ring engages the outboard exterior side and is partially received in the recess.

14. The axle assembly of claim 13 wherein the wheel hub defines a step surface that extends from the outboard exterior side toward the axis, and the outboard split ring has an inner surface that engages the outboard exterior side and an inner pilot that extends toward the axis from the inner surface and that engages the step surface.

15. The axle assembly of claim 1 wherein the outboard split ring encircles and engages the wheel hub and has an inner pilot that protrudes toward the axis and engages the wheel hub to inhibit axial movement of the outboard split ring in the outboard direction.

16. The axle assembly of claim 15 wherein the outboard split ring has a plurality of ring segments that are separate parts and that cooperate to receive the wheel hub.

17. The axle assembly of claim 1 wherein the outboard split ring extends from the wheel hub to the outboard wheel clamp and the outboard wheel clamp extends from the outboard split ring to the outboard wheel.

18. The axle assembly of claim 17 wherein the outboard wheel clamp has a mounting portion that defines a fastener hole that receives a stud fastener that extends from the outboard split ring and an outer flange that extends from an end of the mounting portion in the inboard direction, wherein the outer flange engages the outboard split ring and the outboard wheel.

19. The axle assembly of claim 18 wherein the outer flange has a tapered surface that faces away from the axis, the outboard wheel has a tapered surface that faces toward the axis and engages the tapered surface of the outer flange, and the tapered surface of the outer flange and the tapered surface of the outboard wheel are disposed in a nonparallel and non-perpendicular relationship with the axis.

20. The axle assembly of claim 18 wherein a nut is threaded onto the fastener, a wheel spacer extends from the outboard wheel to the inboard wheel, and tightening the nut urges the outboard wheel clamp, the outboard wheel, the wheel spacer, and the inboard wheel in the inboard direction.

* * * * *